(12) United States Patent
Roberts et al.

(10) Patent No.: US 6,649,243 B2
(45) Date of Patent: Nov. 18, 2003

(54) BAFFLE AND REINFORCEMENT ASSEMBLY

(75) Inventors: Steve Roberts, Sterling Heights, MI (US); Pero Ljubevski, Canton, MI (US); Paul Levandowski, Liberty, MO (US)

(73) Assignee: Sika Corporation, Lyndhurst, NJ (US)

( * ) Notice: Subject to any disclaimer, the term of this patent is extended or adjusted under 35 U.S.C. 154(b) by 0 days.

(21) Appl. No.: 10/126,184

(22) Filed: Apr. 19, 2002

(65) Prior Publication Data
US 2002/0110662 A1 Aug. 15, 2002

Related U.S. Application Data

(62) Division of application No. 09/561,995, filed on May 1, 2000, now Pat. No. 6,413,611.

(51) Int. Cl.[7] .................................................. B32B 3/06
(52) U.S. Cl. ........................... 428/99; 428/99; 428/192; 428/100; 296/187; 296/901
(58) Field of Search .......................... 428/99, 71, 192, 428/100; 296/187, 901

(56) References Cited

U.S. PATENT DOCUMENTS 5,631,027 A * 5/1997 Takabatake
5,806,915 A * 9/1998 Takabatake .................. 296/187

* cited by examiner

Primary Examiner—Alexander S. Thomas
(74) Attorney, Agent, or Firm—Hovey Williams LLP

(57) ABSTRACT

A combined baffle and reinforcing assembly is provided for use within the cavity of a structural member to dampen acoustic transmissions through the cavity and provide reinforcement in a direction transverse to the longitudinal axis of the structural member. The assembly includes a synthetic carrier which includes an interior area, marginal rim, and an attachment member preferably in the form of a clip for insertion to the corresponding hole in the wall of the structural member, and a circumscribing and continuous band of reinforcing material extending around the periphery of the carrier. The assembly may be economically manufactured by co-injection molding or insert molding of the thermally expansible material around the carrier. The marginal rim of the carrier may include base wall and a support flange for receiving the thermally expansible material thereon. After activation of the expansible material, it expands outwardly and bonds the carrier to the surrounding wall of the structural member, leaving an interior area of the carrier uncovered by the foamed expanded material.

7 Claims, 7 Drawing Sheets

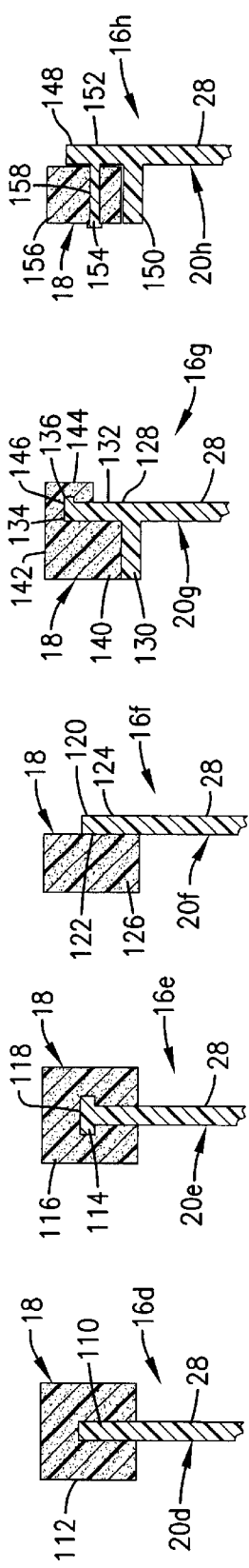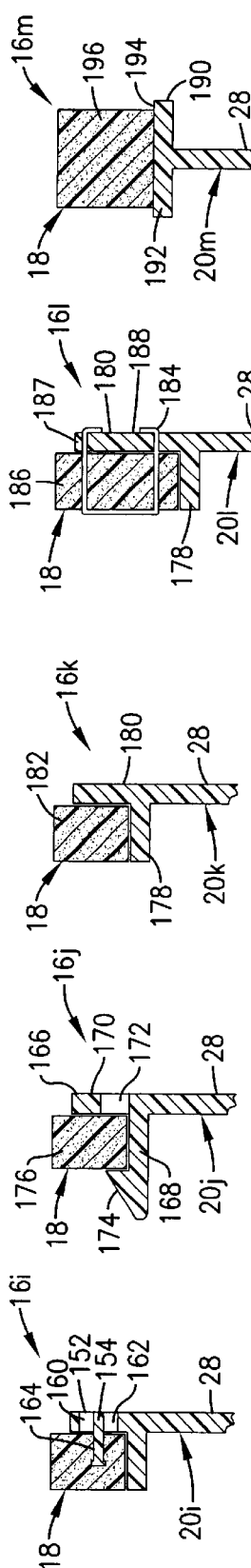

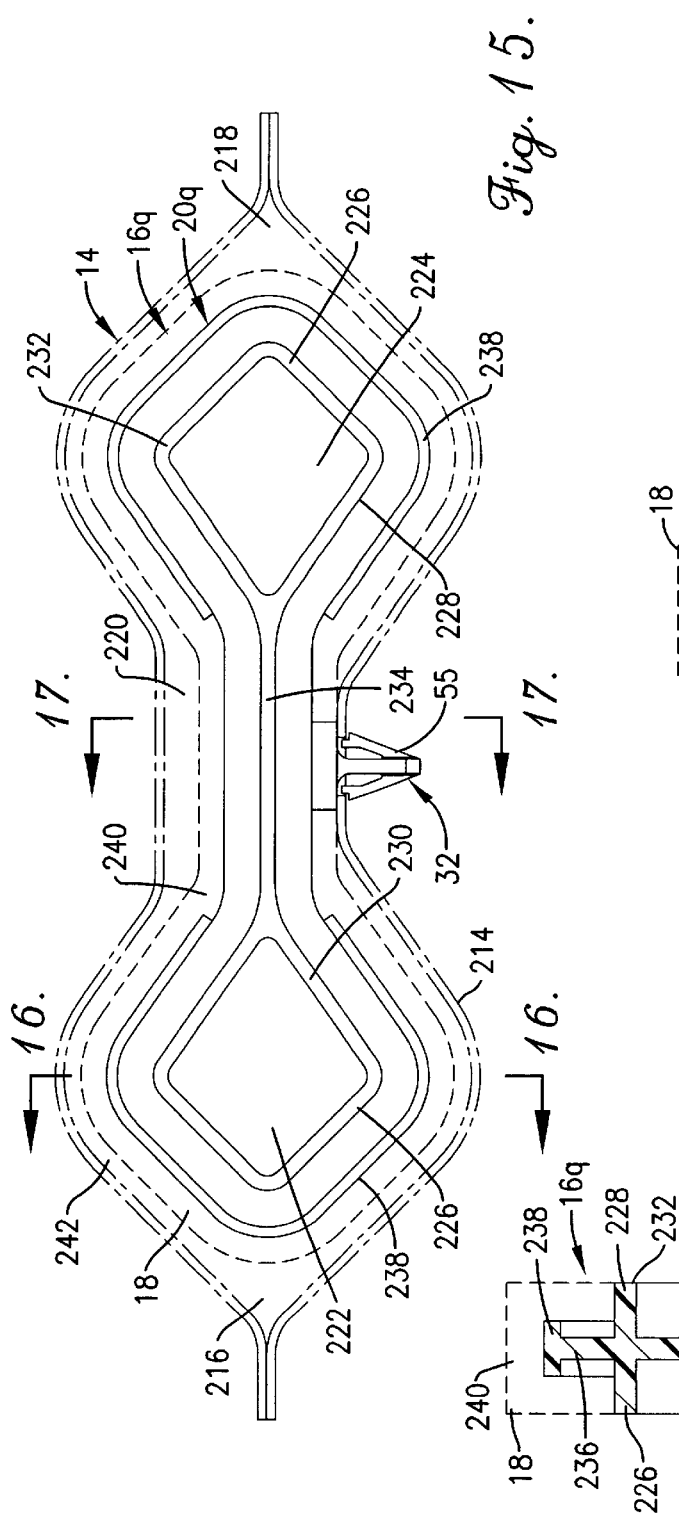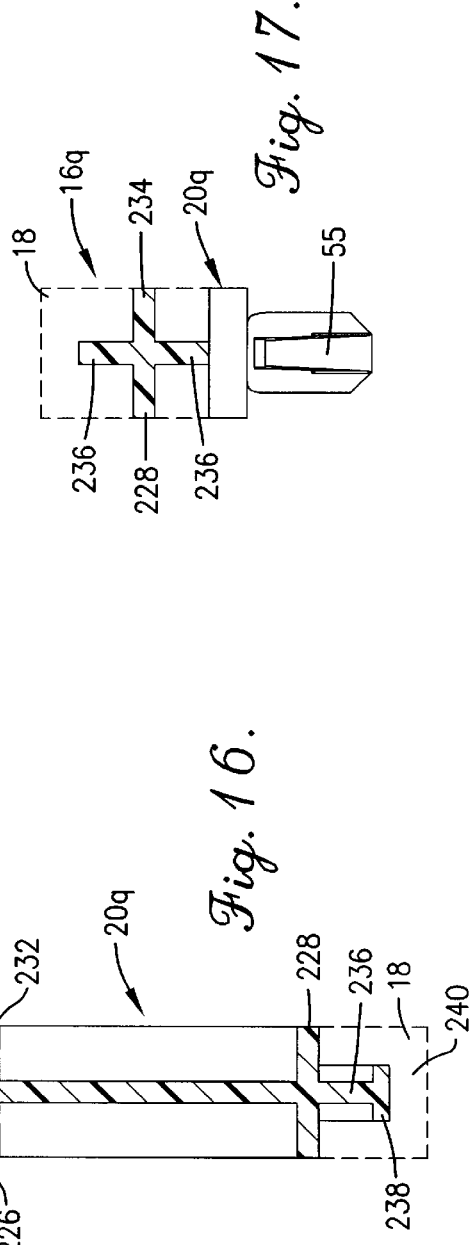

BAFFLE AND REINFORCEMENT ASSEMBLY

RELATED APPLICATIONS

This application is a Divisional of patent application Ser. No. 09/561,995, filed May 1, 2000, titled "Baffle and Reinforcement Assembly", U.S. Pat. No. 6,413,611 which is hereby incorporated into the present application by reference.

BACKGROUND OF THE INVENTION

1. Field of the Invention

The present invention concerns a baffle and reinforcement assembly which includes a carrier and a thermally expansible material designed for positioning in a cavity of a structural member to provide acoustic dampening and limited structural reinforcement. More particularly, the carrier mounts the thermally expansible material around the perimeter of the carrier to permit outward expansion and engagement with the surrounding structural member after activation.

2. Description of the Prior Art

The use of thermally expansible materials as baffles within cavities and to provide limited structural reinforcement has enjoyed increased popularity, particularly in the automotive field. The expansible materials, once activated, block acoustic transmissions through a structural member and provide, to a greater or lesser extent, structural reinforcement to the surrounding structural member. Examples of the use of such baffle assemblies are shown or described, for example, in U.S. Pat. Nos. 5,212,208; 5,266,133; 5,373,027; and 5,506,025. Because the relative expansibility of the material to a great degree affects its compressive strength, the greater the expansibility, the greater the acoustic performance but conversely the lesser the compressive strength and structural reinforcement capability.

However, there has developed a need for improved baffle assemblies which are lighter in weight, use less expansible material, and provide improved reinforcement to the surrounding structural member. Moreover, the particular configuration of the carrier and its manner of connection to the carrier may affect cost and ease of manufacture, the ability of the assembly to retain its shape during shipment, and the ability of the structural member to conform to and bond to the surrounding structural member after activation of the expansible material.

SUMMARY OF THE INVENTION

These and other objects have largely been met by the baffle and reinforcement assembly of the present invention. That is to say, the baffle and reinforcement assembly hereof provides a relatively easy to manufacture and simple to install assembly which inhibits acoustic transmissions through a structural member, provides limited additional reinforcement to the surrounding structural member, and effectively positions the expansible material to enter narrow creases formed in the structural member.

The assembly hereof includes a carrier element which is preferably molded of a synthetic resin material which is resistant to melting when exposed to elevated temperatures encountered in an oven in which the structural member is placed, and a thermally expansible material which is positioned around the periphery of the carrier and expands to engage the surrounding structural member. An attachment member, such as a clip, is provided on the carrier and preferably integrally molded therewith, the attachment member serving to locate and secure the assembly in position. The carrier serves not only to initially position the expansible material in proximity to the wall of the structural member, but also to direct it outwardly toward the structural member and into creases and recesses during expansion, so that expansion is principally directed to permit bonding with the interior surface of the surrounding wall of the structural member. The thermally expansible material is preferably injection molded in surrounding relationship around the carrier in a sequential molding process wherein the mold first receives the synthetic resin for the carrier and then the expansible material in successive infusions, or alternatively insert molded whereby the carrier is molded in a first mold and then transferred to a second mold with the expansible material molded therearound so that the carrier serves as a part of the second mold to provide the completed assembly. The carrier is preferably provided with a surrounding marginal rim which, in certain embodiments, has a base wall which supports and directs the expansible material outwardly, and supporting projections which retain the thermally expansible material thereon and provides a mechanical interconnection between the expansible material and the carrier.

The use of different projections at the margin of the carrier present a plurality of different possibilities for mechanically connecting the expansible material to the carrier. These include a substantially continuous T-shaped projection around which the expansible material may be molded, a plurality of intermittently positioned, circumferentially spaced projections around which the material is molded to present a woven connection, and circumferentially intermittent, alternately axially spaced projections which contain the expandable material therebetween. As used herein, "circumscribing" or "circumferentially" is not limited to circular or arcuate shapes, but rather to a path around the outer margin of irregular or polygonal shapes as well. The margin may also be configured as a U or Y shaped presenting two outwardly extending walls which receive the expandable material therebetween. The expandable material is advantageously formed as a continuous band without interruption around the perimeter of the carrier to ensure thorough and uninterrupted expansion all around the carrier after activation. The carrier and expandable material may also provide additional reinforcement to the structural member by the bonding of the expansible material to the wall of the structural member and the carrier and thus interconnecting the two around substantially the entire inner surface of the wall of the structural member and the entire periphery of the carrier.

BRIEF DESCRIPTION OF THE DRAWINGS

FIG. 14a is a fragmentary cross-sectional view of the margin of a fourth alternative embodiment of the assembly hereof;

FIG. 14b is a fragmentary cross-sectional view of the margin of a fifth alternative embodiment of the assembly hereof;

FIG. 14c is a fragmentary cross-sectional view of the margin of a sixth alternative embodiment of the assembly hereof;

FIG. 14d is a fragmentary cross-sectional view of the margin of a seventh alternative embodiment of the assembly hereof;

FIG. 14e is a fragmentary cross-sectional view of the margin of a eighth alternative embodiment of the assembly hereof;

FIG. 14f is a fragmentary cross-sectional view of the margin of a ninth alternative embodiment of the assembly hereof;

FIG. 14g is a fragmentary cross-sectional view of the margin of a tenth alternative embodiment of the assembly hereof;

FIG. 14h is a fragmentary cross-sectional view of the margin of a eleventh alternative embodiment of the assembly hereof;

FIG. 14i is a fragmentary cross-sectional view of the margin of a twelfth alternative embodiment of the assembly hereof;

FIG. 14j is a fragmentary cross-sectional view of the margin of a thirteenth alternative embodiment of the assembly hereof;

FIG. 14k is a fragmentary cross-sectional view of the margin of a fourteenth alternative embodiment of the assembly hereof;

FIG. 14l is a fragmentary cross-sectional view of the margin of a fifteenth alternative embodiment of the assembly hereof;

FIG. 14m is a fragmentary cross-sectional view of the margin of a sixteenth alternative embodiment of the assembly hereof;

FIG. 15 is a front elevational view of a seventeenth embodiment of the present invention, showing the assembly positioned within a surrounding structural member having a narrowed central portion and showing the outer edge of the expansible material prior to activation in dotted lines;

FIG. 16 is a vertical sectional view taken along line 16—16 of FIG. 15, showing the outer edge of the expansible material prior to activation in dotted lines;

FIG. 17 is a vertical sectional view taken along line 17—17 of FIG. 15, showing the outer edge of the expansible material prior to activation in dotted lines;

DESCRIPTION OF THE PREFERRED EMBODIMENT

Figure 1:
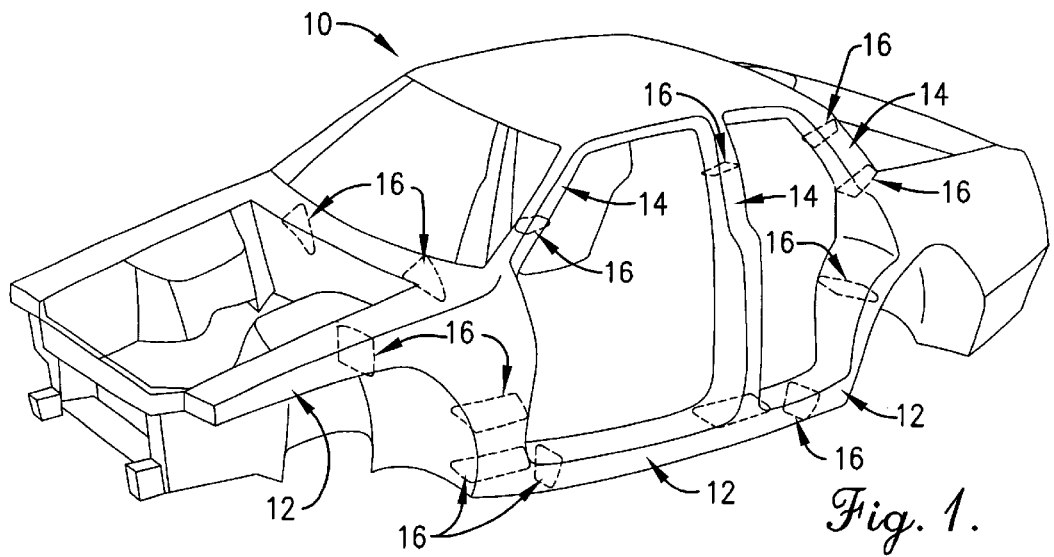
FIG. 1 is a perspective view of an automobile body, illustrating various pillars, rails and structural members where the combined baffle and reinforcing assembly may be utilized.

Referring now to the drawings, an automobile body 10 is shown in FIG. 1. Automobile bodies represent one exemplary use of the present invention, but other examples of uses include aircraft, domestic appliances, buildings including windows, walls and partitions, and marine applications. When used in automotive applications, the baffle and reinforcing assemblies may be used in structural members 14 such as pillars 14a, 14b and 14c, rails 14d and 14e, and various cross-members. The baffle and reinforcement assembly 16 is shown installed within an automobile body within such structural members 14 in FIG. 1. As used in the drawings, like numbers are used to describe like features and the use of relative terms such as up, down, forward and rearward are used herein as an aid to viewing the drawings and not to the particular orientation of the features when installed or in use.

Figure 2:
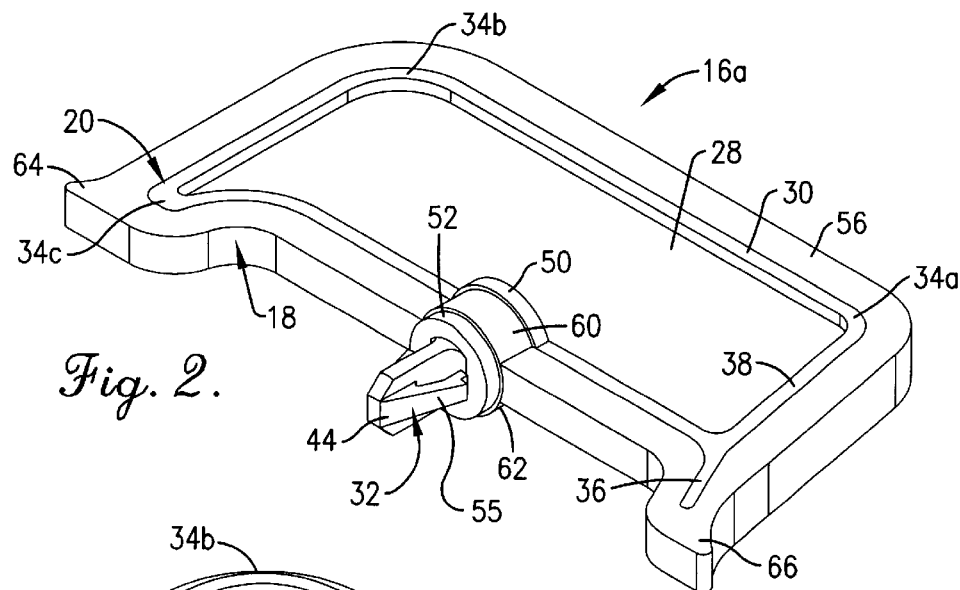
FIG. 2 is a perspective view of a first embodiment of the baffle and reinforcing assembly in accordance with the present invention.
Figure 3:
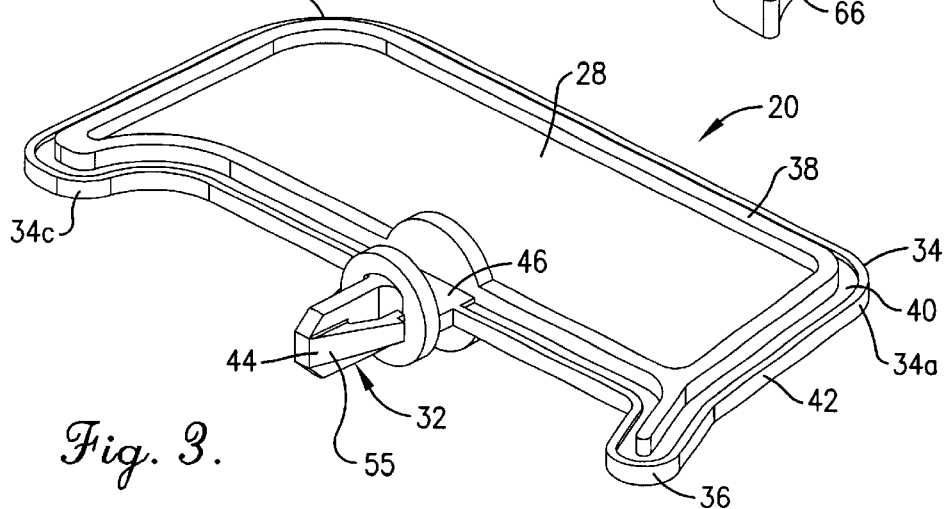
FIG. 3 is a perspective view of the carrier for the baffle and reinforcing assembly shown in FIG. 2.

A first embodiment of the baffle and reinforcing assembly 16a is shown in greater detail in FIGS. 2 through 7. The baffle and reinforcing assembly 16a includes thermally expansible material 18 for which expands and bonds to the surrounding structural member 12 and is disposed around the perimeter of a carrier 20 as seen in FIG. 2. One preferred type of thermally expansible material 18 is sold by Sika Corporation of Madison Heights, Mich. as Sikabaffle 240 and is described in U.S. Pat. Nos. 5,266,133 and 5,373,027 to Hanley et al., the disclosures of which are incorporated herein by reference. Alternatively, if greater reinforcing properties are desired with less expansion, the thermally expansible material 18 could be a reinforcing material such as that sold by Sika Corporation as Sikareinforcer 941, as described in U.S. Pat. No. 6,387,470, the disclosure of which is incorporated herein by reference. Other expansible sealing materials capable of sealing and expansion may also be used. The thermally expansible material 18 may be activated by the external application of heat, or be internally activated by an exothermic reaction.

The thermally expansible material 18 used in the present invention is a dry, initially non-tacky material that develops adhesion upon foaming and expansion so that it adheres to the surrounding structural members when activated. Activation maybe by heating, such as occurs in automobile assembly plants. When subjected to a temperature of at least about 300° F., the thermally expansible reinforcing material should have a percent expansion of at least about 40%, preferably at least about 125%, and more preferably at least about 150%, but less than about 300% to provide sufficient structural reinforcement and compression strength, wherein the percent expansion (as used herein) is defined as:

100×{[(the specific gravity of the material 18 before heating)−(the specific gravity of the material 18 after heating)]/(the specific gravity of the material 18 after heating)}.

One particularly preferred composition for use as material 18 which has especially beneficial reinforcing capability is commercialized under the name SIKAREINFORCER (Sika Corporation, Madison Heights, Mich.). In more detail, the most preferred material 18 comprises: from about 20–30% by weight of an styrene-butadiene-styrene (SBS) block co-polymer (e.g., Fina Clear 530®); from about 5–20% by weight of a polystyrene (e.g., Fina Crystal 500® and Fina Crystal 535®); from about 30–45% by weight of a bisphenol A-based liquid epoxy resin (e.g. Araldite 6010® and Epon 71®); from about 0.5–5% by weight pigments such as carbon black and zinc oxide; from about 0.5 to 10% butadiene acrylo-nitrile rubber (Nipol 1411), from about 1–10% by weight hydrated amorphous silica (HiSil 233); from about 10–20% by weight glass microspheres (Scotchlite S60); from about 0.5–5% by weight a blowing agent such as azodicarbonamide (e.g., Celogen AZ 765®, Celogen AZ 754A®, and Celogen AZ 130®); from about 0.05 to 5% N,N, dimethyl phenyl urea (U405) from about 0.3–5% by weight of a curing agent such as sulfur or dicyandiamide (DDA10), with all percents by weight being based upon the total weight of the material taken as 100% by weight. A particularly preferred composition of the material 18 is 12.94% polystyrene, 23.22% SBS block copolymer, 0.57% carbon black, 1.90% butadiene acrylonitrile rubber, 4.28% hydrated amorphous silica, 38.07% bisphenol A-based liquid epoxyresin, 14.75% glass microspheres, 0.46% zinc oxide, 2.85% dicyandiamide, 0.38% N,N dimethyl phenyl urea, and 0.57% azodicarbonamide. In certain applications where increased compressive strength and reduced foaming and expansion is desired, the foregoing may be adjusted such that the polystyrene is reduced to 12.63%, the SBS block copolymer reduced to 22.59%, and the butadiene acrylonitrile rubber is increased to 2.85%.

The material 18 can be formed by mixing the SBS block co-polymer with a small portion (about ⅟₄₀th of the total amount) of the bisphenol A-based liquid epoxy resin in a heated mixer until the temperature of the mixer reaches from about 240–260° F. (the temperature of the mixture within the mixer is at least about 175° F.) and the mixture is substantially homogeneous, at which time the polystyrene is added to the mixer and mixing is continued. After the polystyrene is substantially mixed with the SBS block co-polymer/epoxy resin mixture, the remainder of the bisphenol A-based epoxy resin is slowly added to the mixer, stopping and starting the mixer as necessary, with the ingredients being thoroughly mixed to obtain a substantially homogeneous mixture. The desired amount of this mixture is placed in a heated mixer (set at a temperature of about 250° F.) and mixing is commenced. While mixing, the carbon black is added to the mixer and mixing is stopped once a homogeneous mixture is obtained within the mixer. Either the silica or glass microspheres is added to the mixer, and mixing is resumed and continued until the mixture is homogeneous. This step is then repeated, adding the other of the silica or glass microspheres.

The temperature of the mixer is then set to a temperature below 160° F., the blowing agent(s), catalyst(s), and curing agent(s) are added and mixing is resumed and continued only until the mixture is homogeneous. The resulting mixture is then preferably extruded into strands (at an extruder temperature of 170–180° F. and screw rotation speeds of about 400 rpm) and cut into pellets. The pellets are then injection molded at a temperature of about 180–200° F. using injection molding equipment designed to form the desired shape of the portion to be attached to the carrier 20.

When a higher acoustic baffling capability and reduced structural reinforcement is desired, the expansible material maybe provided as disclosed in either U.S. Pat. Nos. 5,373,027 or in U.S. Pat. No. 6,150,428 and commercially manufactured by Sika Corporation under the name SIKABAFFLE, the disclosures of which are incorporated herein by reference.

Preferably, the material 18 is activated by the external application of heat. When used in an automobile body 10, it is an important characteristic of the thermally expansible material 18 that it have an activation temperature lower than the bake temperature of the body used for baking paint thereon during manufacture. For example, it is conventional to employ a bake temperature of about 350° F. (177° C.). Accordingly, when used in this application, it is important that the thermally expansible material have an activation temperature of about 300° F. (149° C.) or less. Similarly, it beneficial that the carrier have a melting temperature above the temperature likely to be encountered in bake ovens. The carrier 20 is of a moldable material which is pliable and not brittle and therefor resistant to cracks and breakage. An exemplary material is a black, heat stabilized lubricated 33% glass-reinforced nylon having a heat deflection temperature at 1.8 mPa of 464° F. (240° C.) and a melting point of 504° F. (262° C.). Such a material is marketed as NYLIND 51HSL BK001 by DuPont. However, other similar materials maybe used depending on the desired physical characteristics of the particular application.

Figure 6:
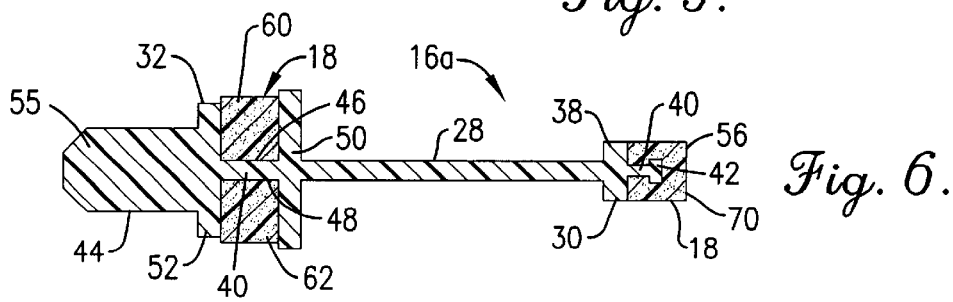
FIG. 6 is a vertical cross-sectional view taken along line 6—6 of FIG. 4.

The assembly 16 is configured to substantially conform to and be complemental to the interior surface 22 of the wall 24 of the structural member 14 defining a longitudinally extending cavity 26 into which the assembly 16 is received. Thus, with regard to the assembly 16a shown in FIGS. 2 through 7, the carrier 20 includes a substantially flat interior area 28 which is not covered by the expansible material 18, a surrounding marginal rim 30 which is similar in shape to the interior surface 22, and an attachment member 32 for coupling the assembly to the structural member 14. In order to position the expansible material 18 proximate to creases D defined by the wall 24, the marginal rim 30 may be formed to include bends 34, including obtuse bend 34a where the adjacent portion of the wall 24 presents an obtuse angle A, a perpendicular bend 34b where the adjacent portion of the wall 24 presents a perpendicular angle B, an acute bend 34c where the adjacent portion of the wall 24 presents an recess C, and a finger 36 where the adjacent portion of the wall 24 presents a crease D of insufficient transverse width to accommodate an acute bend 34c. The marginal rim 30 includes a base wall 38 which inhibits the inward expansion of the thermally expansible material 18 after activation and is oriented at an oblique angle, preferably perpendicular, relative to the interior area 28. The rim 30 further includes a support flange 40 extending outwardly (transversely to the axial direction of the structural member 14) from the base wall 38, and at the periphery of the carrier 20 is a peripheral bead 42 which has a width greater than the width of the support flange 40 but is not as wide as the base wall 38 in the axial dimension as best seen in FIG. 6.

Figure 4:
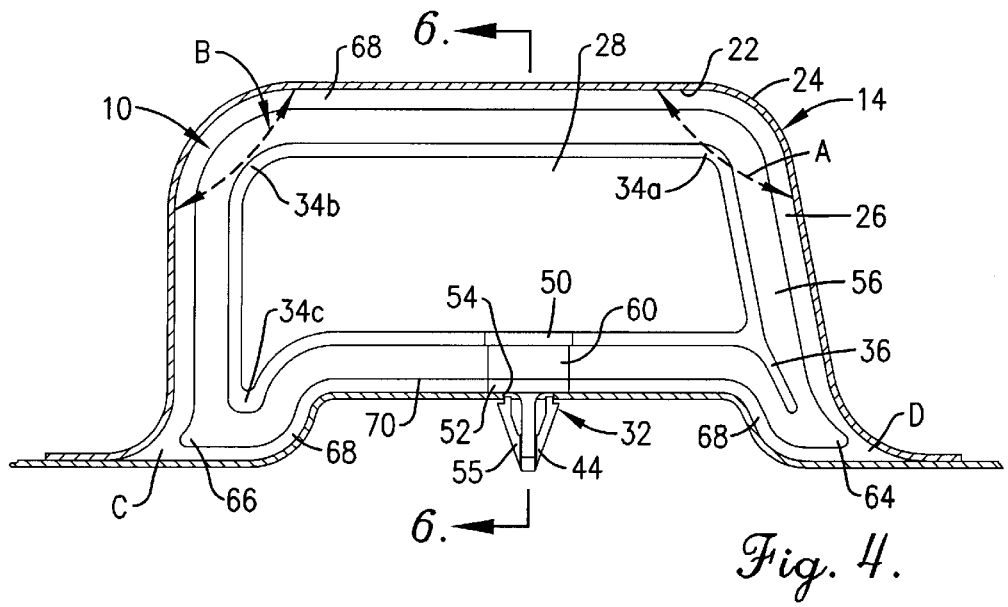
FIG. 4 is a front elevational view of the assembly of FIG. 2 shown prior to activation of the expansible material and positioned in a structural member of an automobile.
Figure 5:
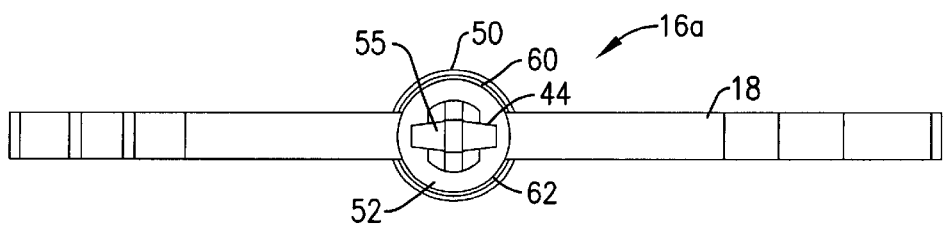
FIG. 5 is a bottom view of the assembly of FIG. 2.
Figure 7:
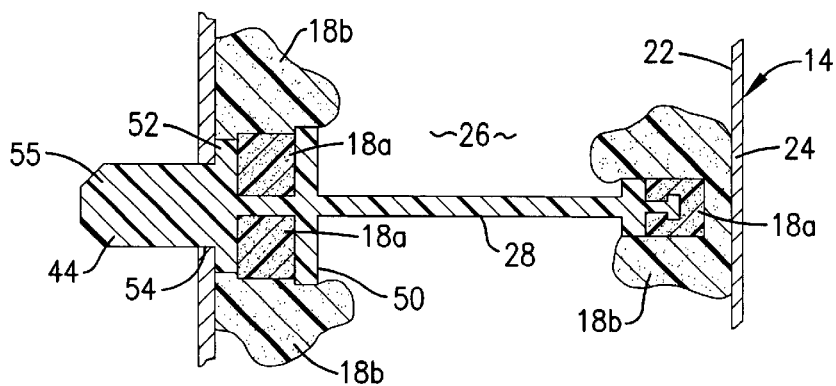
FIG. 7 is a vertical cross-sectional view taken similar to FIG. 6 showing the assembly in a structural member after activation of the expansible material.

The attachment member 32 is preferably integrally molded with the interior area 28 and the marginal rim 30 as a clip 44. Advantageously, the attachment member 32 presents indents 46 and 48, bounded by the support flange 40 and spaced interior and exterior retainer walls 50 and 52, the interior retainer wall 50 being oriented in a plane perpendicular to the adjacent interior area 28 and the exterior retainer wall 52 also being oriented in a plane substantially perpendicular to the interior area 28 adjacent a clip insert 54, whereby the retainer 52 abuts the wall 24 when the insert 54 of the assembly 16 is inserted into an opening 54 in the wall 24 as shown in FIGS. 4 and 7.

The expansible material 18 is configured for receipt around the marginal rim 30 and passage along the indents 46 and 48 to substantially surround the interior area 28, leaving the interior area 28 free of expansible material covering. The expansible material 18 is molded in place around the marginal rim 30 to provide a continuous and uninterrupted band 56 of expansible material 18. Thus, the expansible material 18 is divergent around the support flange 40 adjacent the attachment member to present strips 60 and 62 respectively received in the indents 46 and 48. The expansible material 18 may be advantageously molded to extend into recess C and crease D by tipped portions 64 and 66 respectively which may have a greater thickness in an outward direction than adjacent, essentially linear portions of the expansible material 18.

The assembly 16a is positioned in the cavity of the structural member 14 at an angle, and preferably substantially perpendicular, to the longitudinal direction of the structural member 14. A gap 68 is presented between the wall 24 and the assembly 16a substantially all around the perimeter 70 of the expansible material 18 except where exterior retainer 52 abuts the wall 24, so that a rust preventative coating may flow around and past the assembly 16 after it is coupled to the wall 24. After the body 10 is dipped in the rust preventative coating and the body 10 is painted, the body is placed in an oven and baked at a temperature of about 350° F. The expansible material 18 then expands, preferably at least about 100%, so that the assembly 16a is in substantially blocking relationship to the cavity 26 of the structural member 14, filling the gap 68 as shown in FIG. 7 and bonding to the interior surface 22 of the wall 24 of the structural member. FIG. 7 shows both the expansible material 18 in its initial, unactivated condition 18a, and also its activated and expanded condition 18b which includes the space occupied by 18a.

Figure 8:
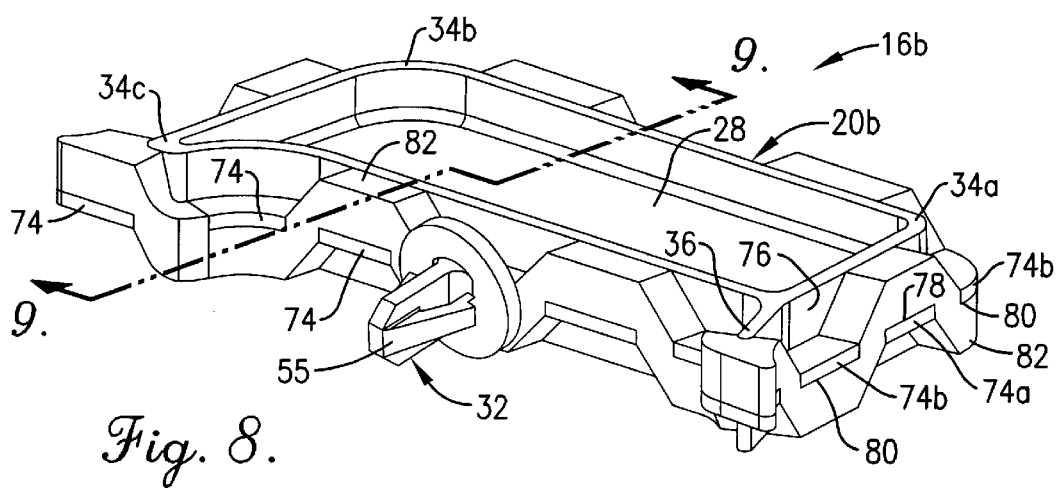
FIG. 8 is a perspective view of a second embodiment of the baffle and reinforcing assembly of the present invention.
Figure 9:
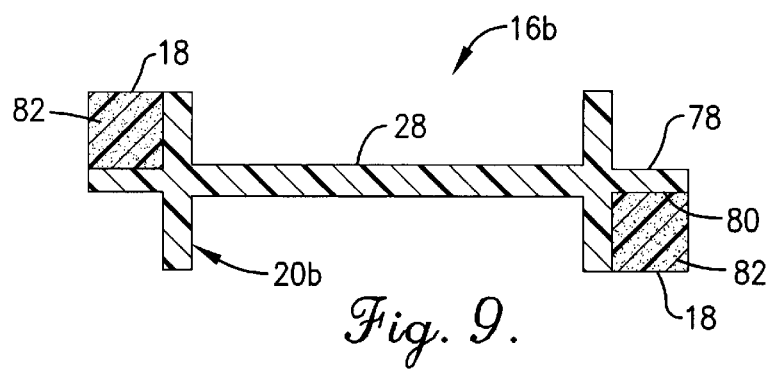
FIG. 9 is a cross-sectional view taken along line 9—9 of FIG. 8.
Figure 10:
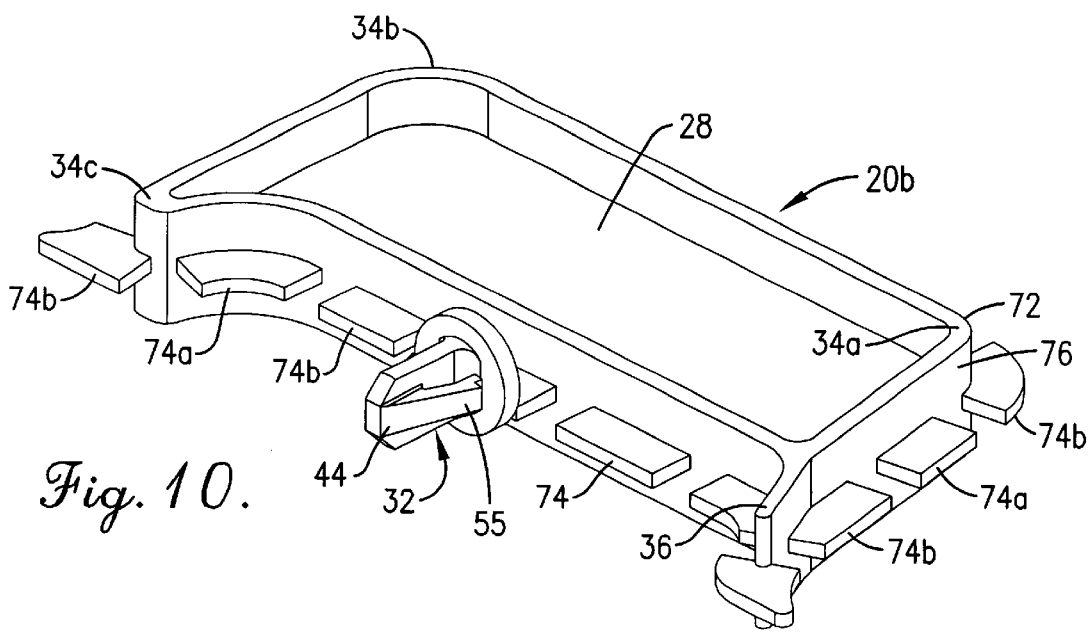
FIG. 10 is a perspective view of the carrier of the embodiment of FIG. 8.

FIGS. 8 and 9 illustrate a second embodiment of the baffle and reinforcement assembly 16b with its carrier 20b alone shown in FIG. 10. Assembly 16b is illustrated as having a carrier 20b including an interior area 28 and attachment member 32 the same as the assembly 16a. However, the marginal rim 72 of assembly 16b is configured differently as is the configuration of the expansible material 18. The marginal rim 72 is provided as a plurality of circumferentially intermittently spaced tabs 74 extending from a base wall 76 which substantially surrounds the interior area 28 as in assembly 16a. The tabs 74 each have a first side 78 and an opposite second side 80 and are centered longitudinally on the base wall 76 and thus are substantially coplanar with interior area 28. The expansible material 18b is configured as a band 82 which is continuous and serpentine around the base wall 76 and woven around and between the tabs 76, whereby the band 82 abuts a first side 78 of one tab 74a and then abuts a second side 80 of an adjacent tab 74b. The expansible material may thus pass only along one indent 46 of the attachment member 32 and remain continuous around the base wall 76 of the carrier 20b. The assembly 16b is inserted and employed the same as assembly 16a, so that after expansion, the expansible material 18 substantially fills the gap between the assembly 16b and the wall 24 of the structural member 14 to block the cavity longitudinally.

Figure 11:
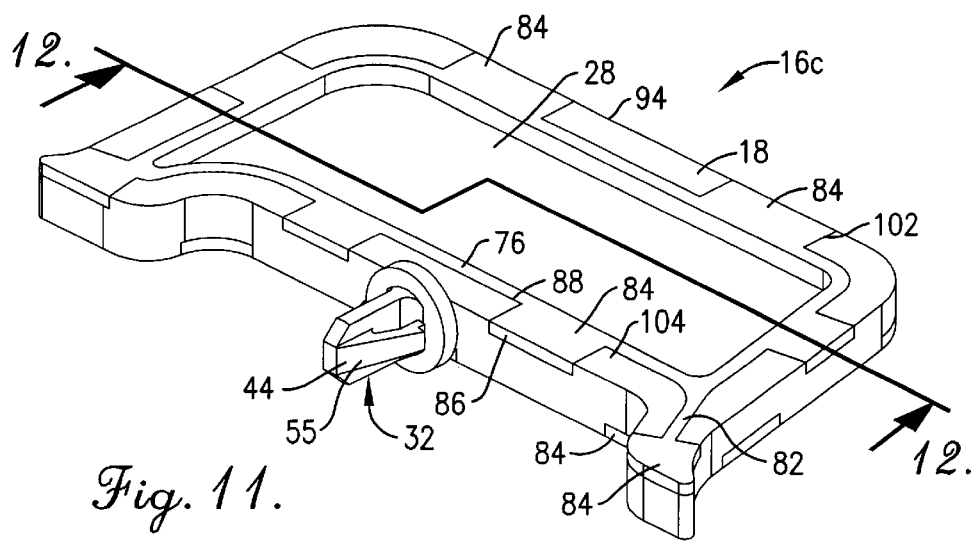
FIG. 11 is a perspective view of a third embodiment of the baffle and reinforcing assembly of the present invention.
Figure 12:
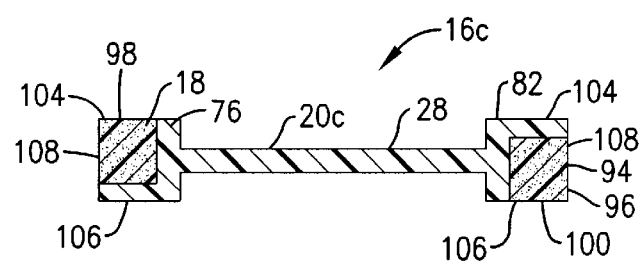
FIG. 12 is a cross-sectional view taken along line 12—12 of FIG. 11.
Figure 13:
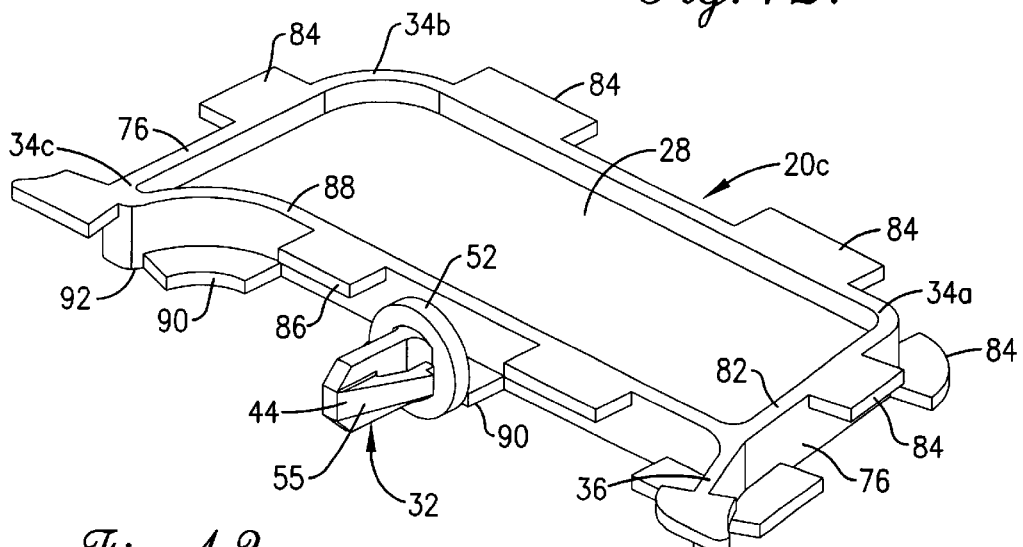
FIG. 13 is a perspective view of the carrier of the embodiment of FIG. 11.

A third embodiment of the baffle and reinforcing assembly 16c is shown in FIGS. 11 and 12, with the carrier 20c alone shown in FIG. 13. Again, the carrier 20c has an interior area 28 and attachment member 32 substantially the same as assembly 16a, and is installed and used in the same manner. However, the marginal rim 82 includes a base wall 76 which substantially surrounds the interior area 28 with castellated alternating tabs 84 extending outwardly away from the interior area 28. The tabs 84 are circumferentially intermittently spaced around the base wall 76, but rather than being coplanar with the interior area 28, are provided as front tabs 86 extending outwardly from a front edge 88 of the base wall and rear tabs 90 extending outwardly from a rear edge 92 of the base wall 76 and thus spaced in the longitudinal direction along the base wall 76 from the front tabs 86. The expansible material 18 is thus provided as a band 94 which is substantially even and continuous along an outer margin 96 thereof, but is irregular along a front margin 98 and a rear margin 100 to provide a plurality of alternating recessed notches 102 into which the alternating tabs 84 interfit. The band 94 of expansible material 18 is thus molded into a complemental and interfitting relationship onto the carrier 20c, whereby the expansible material 18c and marginal rim 82 cooperate to present combined flat front surface 104 and rear surface 106, and a smooth and continuous outer surface 108. As shown in FIGS. 11 and 13, one of the rear tabs 90 receives the exterior retainer 52 for positioning the clip 44.

FIGS. 14a through 14m show alternative configurations of the baffle and reinforcing assembly 16 having an interior area 28 and attachment member 32 as shown and described in reference to assemblies 16a, 16b, and 16c. The expansible material 18 is also as described above, and may be routed through or over the insets as described with reference to any of the assemblies 16a, 16b or 16c. FIG. 14a shows an assembly 16d having a carrier 20d with a marginal rim 110 which is an extension of the interior area 28 and so does not extend forwardly or rearwardly from the interior area but is rather coplanar with the interior area. The marginal rim 110 receives expansible material 18 therearound as a U-shaped band 112. FIG. 14b shows an assembly 16e having a carrier 20e with a T-shaped marginal rim 114 which receives expansible material 18 therearound as a band 116 having a complemental T-shaped slot 118. FIG. 14c shows an assembly 16f having a carrier 20f with a marginal rim 120 extending coplanar with the interior area 28 without a base wall and presenting front and rear sides 122 and 124, the expansible material 18 being provided as a continuous band 126 adhesively attached to one of the front or rear sides.

FIG. 14d shows an assembly 16g having a carrier 20g with a marginal rim 128 including a forwardly extending base wall 130, a support flange 132, and a peripheral bead 134 which does not extend forwardly but includes a rearwardly extending lip 136. The expansible material is 18 molded as a continuous band 138 presenting a modified C-shape having a front leg 140 positioned over the base wall 130, a central bight 142 outwardly of the periphery 134 and a rear leg 144 extending rearwardly over the support flange 132 and receiving the lip 136 in a groove 146 therein.

FIG. 14e shows an assembly 16h having a carrier 20h with a marginal rim 148 including a forwardly extending base wall 150, an outwardly extending support flange 152, and a forwardly extending T-shaped post 154 positioned substantially parallel and opposed to the base wall 150. The expansible material 18 is provided as a continuous band 156 which extends around the carrier 20g and is provided with a bore 158 in registry with the post 154 which passes through the bore 158 to retain the band 156 thereon. It is to be understood that typically a plurality of such posts 154 and corresponding bores 158 would be circumferentially spaced around the marginal rim 148 and band 156. FIG. 14f shows an assembly 16i configured similarly to assembly 16h, but wherein the carrier 20i has a marginal rim including post 154 and openings 160 and 162 through the support flange 152, and the expansible material 18 is molded in a continuous band with a hole 164 extending only partway therethrough. The assembly 16i thus permits expansible material 18, upon activation, to expand through the openings 160 and 162 to provide better mechanical attachment to the carrier 20i.

FIG. 14g shows an assembly 16j wherein the carrier 20j includes a marginal rim 166 having a forwardly extending base wall 168 and a support flange 170 with circumferentially intermittent openings 172 therethrough. The base wall 168 includes one or a plurality of circumferentially spaced outwardly extending barbs 174 for holding a band 176 of expansible material 18 against the support flange 170. FIG. 14h shows an assembly 16k wherein the marginal rim of the carrier 20k includes a forwardly extending base wall 178 and an outwardly extending support flange 180 for positioning the surrounding band 182 of expansible material 20 thereon. FIG. 14i shown an assembly 16l similar to assembly 16k, but wherein a staple 184 is used as a mechanical fastener which penetrates through and attaches a band 186 of expansible material 18 to the support flange 187 of marginal rim 188.

FIG. 14j shows an assembly 16m wherein the carrier 20m has a marginal rim 190 with a base wall 192 having an outer periphery 194 with a band 196 of expansible material adhesively attached on the outer periphery 194. FIG. 14k shows an assembly 16n wherein the carrier 20n has a marginal rim 198 having a forwardly extending base wall 200 and a pair of outwardly extending legs 202 and 204 defining a circumferentially extending channel 206 into which a band 208 of expansible material 18 is received and extends outwardly beyond the marginal rim 198. FIG. 14l shows an assembly 16o with a carrier 20o similar to that shown in FIG. 14d but without the lip 136. FIG. 14m shows an assembly 16p with a carrier 20p similar to that shown in FIGS. 2 through 7, but wherein the band 210 of expansible material 18 is of a width substantially the same as the width of the interior area 28, thereby enabling sealing in relatively longitudinally narrow cavities.

FIGS. 15, 16 and 17 show an assembly 16q which is specially configured to fit into a cavity 212 of a structural member 14 which is defined by a surrounding wall 214 to present two larger openings 216 and 218 interconnected by a narrowed area 220. It is desirable that a single assembly 16q be used in such applications to provide complete blockage of the cavity 212 and improved reinforcing characteristics where two separate assemblies might present acoustic pathways if, upon activation of the expansible material 18, the closure therebetween was incomplete. The assembly 16q avoids this concern by a carrier 20q presenting a first substantially planar interior area 222 connected to a second substantially planar interior area 224. The interior areas 222 and 224 are shown positioned in coplanar relationship but it may be appreciated that they may be angularly oriented to one another. Marginal rim 226 is provided around each of the interior areas 222 and 224 to include a base wall 228 having two loop segments 230 and 232 and an interconnecting center section 234. A support flange 236 extends outwardly from the base wall 228, and in each of the loop sections includes a peripheral bead 238 as shown in FIG. 16. In the center section 234, the peripheral bead is omitted for space considerations in order to fit in the narrowed area 220, whereby in the center section 234, the marginal rim 226 is substantially cruciform in cross-section. The carrier 20q includes an attachment member 32 in the form of the clip attachment previously described. The expansible material 18 is provided as a continuous and uninterrupted band 240 which surrounds the carrier 20q to present a gap 242 between the wall 214 of the structural member and the assembly 16q for the reasons described above, the gap being closed after activation of the expansible material 18.

Figure 18:
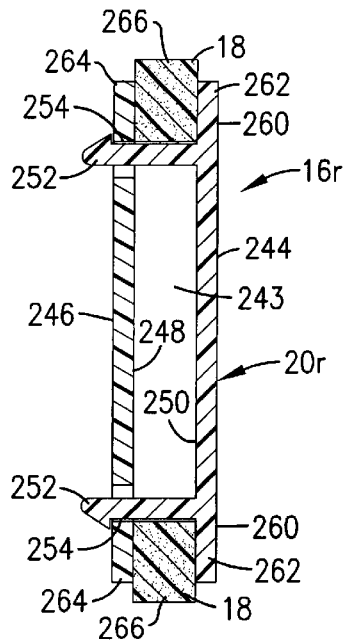
FIG. 18 is a horizontal sectional view of a eighteenth embodiment of the present invention having a carrier with two interlocking panels for gripping the expansible material around the margin thereof.
Figure 19:
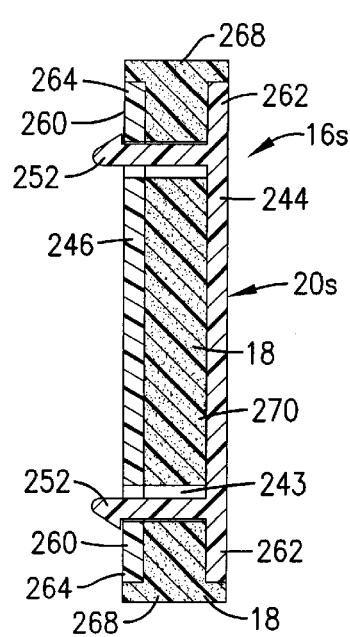
FIG. 19 is a horizontal sectional view of a nineteenth embodiment of the present invention similar to FIG. 18 but including a central core of expansible material between the interlocking panels.

FIGS. 18 through 23 illustrate further alternative embodiments of the assembly 16 hereof, each including an attachment member 32 as described above but not shown in the illustrated cross-sections. In FIG. 18, an assembly 16r includes a two-part carrier 20r which provides a central space 243 between a first member 244 and a second member 246. Each of the members 244 and 246 are preferably of molded nylon as described above and present longitudinally spaced substantially parallel interior walls 248 and 250. A plurality of prongs 252 extend forwardly from member 244 and pass through holes 254 in the other member 246 positioned in registry with and sized to receive the prongs 252 therethrough. Thus, member 244 is releasably interlocked with member 246 because prongs 252 can be shifted inwardly and passed back through holes 254 to release member 244 from member 246. The carrier 20r includes a marginal rim 260 outwardly of the prongs 252 and holes 254 defined by support flanges 262 and 264, whereby a circumferentially extending continuous band 266 of expansible material 18 is received between the support flanges 262 and 264 and prevented from movement into the central space 243 by prongs 252. After activation, the expansible material moves outwardly in a direction to engage and adhere to the walls of the structural member 14, and is also free to flow into the central space 243 and bond together the members 244 and 246. FIG. 19 illustrates a further embodiment of the assembly 16s having a carrier 20s similar to the carrier of assembly 16r, wherein the surrounding band 268 of expansible material 18 is T-shaped and the central space 243 is at least partially occupied by a central block 270 of expansible material 18 which is discrete and separate from band 268 along two opposed sides as shown in FIG. 19. Upon activation, the expansible material 18 flows outwardly of the carrier 20r and bonds the carrier 20r to the surrounding structural member 14.

Figure 20:
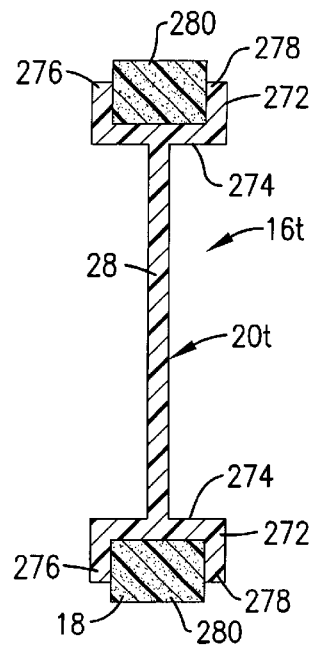
FIG. 20 is a horizontal sectional view of a twentieth embodiment of the present invention wherein the carrier is provided with a rim having a base in two upstanding legs receiving the expansible material therein.
Figure 21:
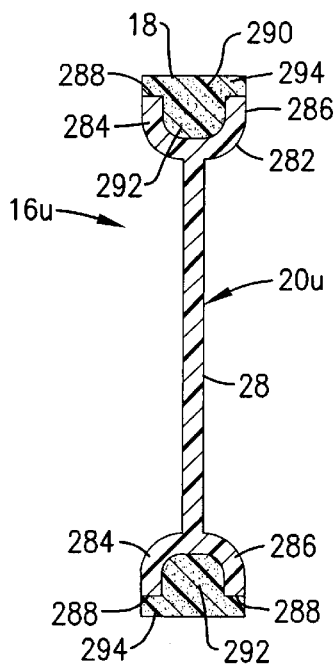
FIG. 21 is a horizontal sectional view of a twenty-first embodiment of the present invention wherein the carrier is provided with a U-shaped rim receiving the expansible material therein.

FIG. 20 illustrates a further assembly 16t, similar to that illustrated in FIG. 14k, but wherein the carrier 20t has a marginal rim 272 with a base wall 274 extending both forwardly and rearwardly of interior area 28 and provided with outwardly extending support flanges 276 and 278 which receive a circumscribing, continuous band 280 of expansible material therebetween. FIG. 21 illustrates an assembly 16u with a carrier 20u similar to that shown in FIG. 20, but wherein the marginal rim 282 is of U-shaped configuration presenting a pair of outwardly extending support flanges 284 and 286 with outer edges 288 thereon, the expansible material 18 being provided as a continuous band 290 with a central bead 292 received between the support flanges 284 and 286 and longitudinally divergent head portion 294 overlying the outer edges 288.

Figure 22:
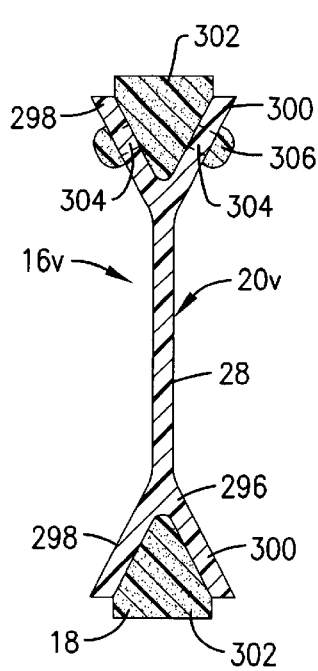
FIG. 22 is a horizontal sectional view of a twenty-second embodiment of the present invention wherein the carrier is provided with a V-shaped rim including circumferentially intermittently spaced openings on a portion thereof for receiving nibs of the reinforcing material therethrough.
Figure 23:
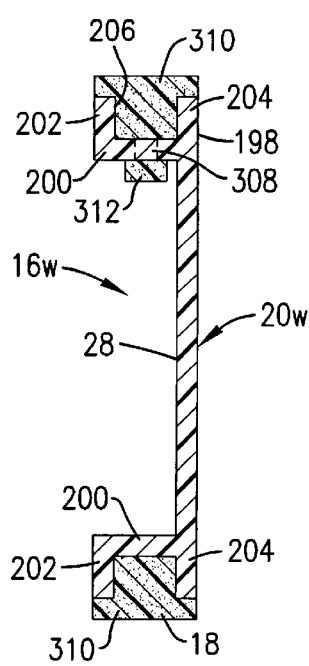
FIG. 23 is a horizontal sectional view of a twenty-third embodiment of the present invention, wherein the carrier includes a rim having a base wall extending perpendicularly to a central panel and an upright leg extending outwardly from the base wall to receive therein the expansible material.

FIG. 22 illustrates a further embodiment of the assembly 16v, wherein the carrier 20v is configured with a marginal rim 296 being V-shaped in cross section having two divergent flanges 298 and 300 receiving a wedge 302 of expansible material therebetween. The flanges 298 and 300 have circumferentially intermittently spaced openings 304 wherein during molding in place, expansible material 18 flows through the openings 304 to provide nibs 306 extending inwardly through the openings 304 to mechanically hold the wedge 302 in place. FIG. 23 shows an embodiment of the assembly 16w which is similar to that shown in FIG. 14k, but wherein the base wall 200 of the carrier 20w has intermittently spaced holes 308 therethrough, whereby during molding, a portion of the band 310 of expansible material 18 may flow therethrough to provide a button 312 to hold the band 310 in place prior to activation.

What is claimed is:

1. A baffle and reinforcement assembly adapted for positioning in a cavity within a structural member, said assembly comprising:
   a synthetic resin carrier including a first member having a marginal rim and an interior area pressing an inward face and an outward face, and a second member having a marginal rim and an interior area presenting an inward face opposed to the inward face of the first member and a outward face, said interior areas of said first and second members lying in spaced parallel planes, one of said first member and said second member having an attachment member integral with its interior area and marginal rim adapted for coupling to the structural member;
   a continuous and circumscribing band of thermally expansible material positioned intermediate the first and second members and mounted to their marginal rims in a surrounding relationship thereto but not overlying the outward face of the interior area of either the first and second members; and
   a block of thermally expansible material which is discrete and separate from said circumscribing band along two opposed sides of said block, said block being positioned intermediate the interior areas of said first and second members and lying adjacent their opposing inward faces but not overlying the outward faces of the interior area of either the first and second members and positioned inwardly of the circumscribing band.

2. A reinforced structural member comprising:
   a wall having a longitudinal axis, said wall having an opening, said wall defining a cavity therein; and
   a baffle and reinforcement assembly positioned within said cavity transverse to said longitudinal axis, said assembly comprising:
      a synthetic resin carrier including a first member having a marginal rim and an interior area presenting an inward face and an outward face, and a second member having a marginal rim and an interior area presenting an inward face opposed to the inward face of the first member and an outward face, said interior areas of said first and second members lying in spaced parallel planes, one of said first member and said second member having an attachment member integral with its interior area and marginal rim adapted for coupling to the structural member;
      a continuous and circumscribing band of thermally expansible material positioned intermediate the first and second members and mounted to their marginal rims in a surrounding relationship thereto but not overlying the outward face of the interior area of either the first and second members; and
      a block of thermally expansible material which is discrete and separate from said circumscribing band along two opposed sides of said block, said block being positioned intermediate the interior areas of said first and second members and lying adjacent their opposing inward faces but not overlying the outward faces of the interior area of either the first and second members and positioned inwardly of said circumscribing band,
      whereupon after activation of said expansible material, said expansible material expands and bonds to said carrier and said wall but does not cover said carrier.

3. A baffle and reinforcement assembly adapted for positioning in a cavity within a structural member, said assembly comprising:
   a synthetic resin carrier including a first member having a marginal rim and an interior area presenting an inward face and an outward face, and a second member having a marginal rim and an interior area presenting an inward face opposed to the inward face of the first member and an outward face, said interior areas of said first and second members lying in spaced parallel planes, one of said first member and said second member having an attachment member integral with its interior area and marginal rim adapted for coupling to the structural member, said first member being releasably interlocked to the second member by a connector of the first member extending toward and coupled to a receiving site of the second member; and
   a component of thermally expansible material coupled to said carrier and positioned intermediate the first and second members.

4. A baffle and reinforcement assembly as set forth in claim 3, wherein said connector on said first member includes a prong and said second member includes a wall, said receiving site of said second member including a hole in said wall through which said prong passes.

5. A baffle and reinforcement assembly as set forth in claim 3, wherein said component of said thermally expansible material includes a continuous and circumscribing band of said thermally expansible material positioned intermediate the first and second members and mounted to their marginal rims in a surrounding relationship thereto but not overlying the outward face of the interior area of either the first and second members.

6. A baffle and reinforcement assembly as set forth in claim 3, wherein said component of said thermally expansible material includes a block of said thermally expansible material positioned intermediate the interior areas of said first and second members and lying adjacent their opposing inward faces but not overlying the outward faces of the interior area of either the first and second members.

7. A baffle and reinforcement assembly as set forth in claim 3, wherein said component of said thermally expansible material includes a continuous and circumscribing band of said thermally expansible material positioned intermediate the first and second members and mounted to their marginal rims in a surrounding relationship thereto but not overlying the outward face of the interior area of either the first and second members and a block of said thermally expansible material positioned intermediate the interior areas of said first and second members and lying adjacent their opposing inward faces but not overlying the outward faces of the interior area of either the first and second members.

* * * * *